Jan. 13, 1970 A. A. BAKER, JR 3,489,861

ALTERNATING OUTPUT TELEPHONE TYPE DIAL

Filed Sept. 23, 1966

INVENTOR.
ADOLPH A. BAKER

BY Hoffman Stone

ATTORNEY 3,489,861

ALTERNATING OUTPUT TELEPHONE TYPE DIAL

Adolph A. Baker, Jr., Rochester, N.Y., assignor to Stromberg-Carlson Corporation, Rochester, N.Y., a corporation of Delaware Filed Sept. 23, 1966, Ser. No. 581,470
Int. Cl. H04m *1/26*
U.S. Cl. 179—90 5 Claims

ABSTRACT OF THE DISCLOSURE

A cam and shield arrangement actuated by a telephone dial shifts the output of the dial from one line to another on successively dialed digits. The cam that actuates the switch is driven by a follower carried by the telephone dial and held out of engagement from the cam except during the same selected terminal portion of the unwinding travel of the dial so that the cam is advanced a predetermined angular increment for each actuation of the dial regardless of the digit dialed.

This invention relates to a novel telephone type dial construction, and, more particularly, to a novel dial arrangement for switching output signals from a telephone dial alternately among two or more different output circuits to enable responsive switching equipment to distinguish positively between successively dialed groups of signals.

It is the general practice in automatic telephone equipments using pulse dialing, as distinguished from selective frequency, or tone dialing, to connect each individual telephone sub-station to the central switching office, or switchboard through a single two-wire circuit, and to include circuits at the central office, or switchboard to distinguish between successively dialed digits by recognizing the relatively long delay between the digits, which is ordinarily several times as long as the interval between the individual pulses of a single digit. This is generally a satisfactory system, and has the major advantage of requiring only a single two-wire circuit between the local station and the switching equipment.

In certain other equipments, however, that make use of telephone type dials for control purposes, and in telephone systems where the dial, or dials may be located very close to the switching equipment, it is more economical to provide extra leads between the dials and the switching equipment than to provide circuits for discriminating between the short intervals that separate the pulses of a single digit and the long intervals that separate the digits. In such systems, it has been found less expensive to feed the successive digits into the switching equipment successively on alternate circuits, and to discriminate between the successive digits responsively to changes in the circuits used.

The dial arrangement of the invention provides a simple and inexpensive, yet reliable and long lasting means for successively switching the output of a telephone type dial among different output circuits responsively to operation of the dial, so that successive series of pulses representing successive digits are routed over successively different channels to the switching equipment.

Figure 1:
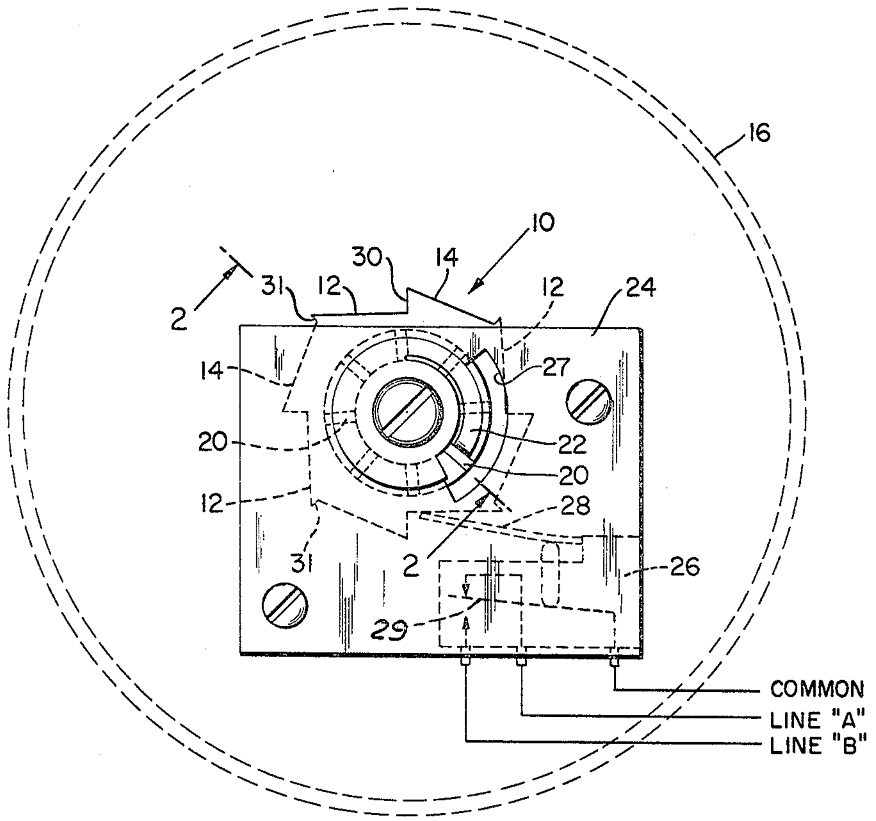
Figure 2:
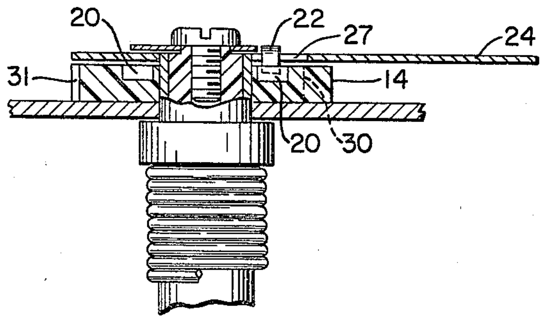

A presently preferred embodiment of the invention will now be described in detail in connection with the accompanying drawing, wherein:

FIGURE 1 is a bottom view of a switching arrangement responsive to the operation of a telephone dial in accordance with the invention, and including a fragmentary schematic circuit diagram of the switched circuit; and, FIGURE 2 is a cross-sectional view taken along the line 22 of FIGURE 1.

Briefly, the embodiment of the invention described herein includes a stepping cam having alternate high and low lobes for driving a spring biased, double-throw switch alternately between its two operative positions, and a shielded cam fixed to the first cam for driving it one step responsively to movement of the dial through a selected terminal portion of its travel as it completes the transmission of a series of pulses representing any one digit. The dial carries a spring biased driving dog, and the shielding arrangement holds the dog out of engagement with the cam during all but the selected terminal portion of the travel of the dial. Thus, regardless of the over-all travel of the dial, whether ten pulses are transmitted, or only one, the cam is stepped one step only.

By appropriately modifying the cam, and by using a switch having more than two positions, the output signal may be switched among as many different lines as desired. It is believed, however, that simple alternation between two different lines will be found to be fully adequate for most utilizations.

Referring now to the drawing, a rim cam 10 having alternate low lobes 12 and high lobes 14 is rotatably mounted in coaxial alignment with the hub of a telephone type dial 16. A crown cam 20 is fixed to the rim cam 10 coaxially therewith, and is drivable by a spring finger 22, which is fixed to the telephone dial 16 and rotates with it. A shield 24 is fixed to the housing, or other support upon which the dial 16 is mounted, and extends beneath the crown cam 20. The shield 24 has a central, keyhole shaped aperture 26, the shaft portion of which underlies the hub of the dial 16. The wedge portion of the keyhole aperture 26 underlies the crown cam 20. When the dial is actuated, that is, spun back in a counter clockwise direction as viewed in FIGURE 1, preparatory to its release, the spring finger 22 is drawn out of the wedge portion of the aperture 26 and rides upon the shield 24 out of engagement with the crown cam 20 through most of the travel of the dial. When the dial 16 is subsequently released, its spring mechanism drives it clockwise, as viewed in FIGURE 1, to produce the output pulses. During most of the pulse producing travel of the dial in its clockwise direction, the spring finger 22 rides upon the shield 24. When the dial approaches the last 45° of its travel, the spring finger 22 enters the wedge portion of the keyhole aperture 26 and comes into engagement with one of the teeth of the crown cam 20. As the dial completes the last 45° of its travel, the spring finger 22 drives the crown cam 20, and with it the rim cam 10 through approximately 45°.

The switch 29 is operated by the rim cam 10 through a cam follower 28, which is spring urged into engagement with the cam 10. When the follower 28 lies upon one of the low lobes 12 of the cam, the switch 26 is in its first operative position. When the follower lies upon one of the high lobes 14 of the cam, the switch 26 is in its second operative position.

For positive operation, and to avoid reverse motion of the cams 10 and 20 responsively to winding up of the dial, that is, to avoid having the spring finger 22 pull the cam counterclockwise during the initial winding travel of the dial 16, the cam 10 is preferably made as shown in FIGURE 1 with its lobes 12 and 14 shaped much like ratchet teeth. The cam thus rises from the end of each of its falls 30 and 31 to the beginning of the succeeding one, and the falls are either reentrant relative to the cam travel or lie generally in radial planes. The follower 28 is thus made to act as a ratchet dog, resting in each one of its operative positions against one of the falls 30 and 31 of the cam, thereby holding the cam 10 against reverse rotation. The follower 28 also urges the cam 10 in its reverse direction until it is stopped by abutment against one of the falls 30 and 31, thus ensuring that the crown cam 20 will be properly positioned to be engaged by the spring finger 22 upon the next operation of the dial. An over travel arrangement of any desired type is provided between the follower 28 and the armature of the switch 29 to permit travel of the follower 28 over the points of maximum rise of the cam 10.

What is claimed is:

1. A telephone type dial arrangement comprising a telephone type dial, a cam having alternate high and low lobes, a switch drivable between two operative positions, a follower driven by said cam for driving said switch between said operative positions, and means responsive to rotation of the telephone dial through a selected terminal portion of the unwinding travel thereof for advancing said cam the same predetermined angular increment for each actuation of the dial regardless of the digit dialed.

2. A cam arrangement for switching the output of a telephone type dial successively among plural output circuits comprising a rotatable cam, a follower biased toward engagement with said cam, a switch drivable by said follower responsively to rotation of said cam, and means responsive to rotation of the telephone dial through a selected terminal portion of the unwinding travel thereof for advancing said cam the same predetermined angular increment for each actuation of the dial regardless of the digit dialed.

3. A cam arrangement in accordance with claim 2, wherein the lobes of said cam are shaped generally like the teeth of a ratchet and the falls of said cam are reentrant relative to the desired direction of rotation of said cam, whereby said follower acts as a ratchet dog to limit rotation of said cam in the reverse direction.

4. A cam arrangement in accordance with claim 3, wherein said cam rises continuously from the end of each fall to the beginning of the succeeding one, so that said follower tends to urge said cam in the reverse direction until a fall comes into engagement with said follower.

5. A cam arrangement in accordance with claim 2, wherein said advancing means includes a second cam, a driving dog fixed to the hub of the dial and yieldably biased toward said second cam, and a shield for keeping said dog out of engagement with said second cam during all travel of the dial except for a predetermined portion thereof adjacent to the end of its unwinding travel.

References Cited

UNITED STATES PATENTS 2,329,022 9/1943 Willis ---------------- 179—90

KATHLEEN H. CLAFFY, Primary Examiner

J. S. BLACK, Assistant Examiner